United States Patent Office 2,719,871
Patented Oct. 4, 1955

2,719,871

PREPARATION OF DITOLYLPROPANE

Richard Rowls Hiatt, Cambridge, Mass., assignor to E. I. du Pont de Nemours and Company, Wilmington, Del., a corporation of Delaware No Drawing. Application September 21, 1954,
Serial No. 457,543

3 Claims. (Cl. 260—668)

This invention relates to improvements in the synthesis of 2,2,-bis-(p-tolyl)propane and related compounds.

Ditolylpropanes have been prepared heretofore. Recently it has been reported that 2,2-bis-(p-tolyl)propane can be obtained by condensation of acetone with toluene in the presence of sulfuric acid (U. S. Patent 2,455,643). The latter method has been the subject of a considerable amount of study and it has been observed that the yield of ditolylpropane from acetone and toluene is frequently, if not invariably, less than 6% of the theoretical. Improved methods for preparing 2,2-ditolylpropane would be of considerable value since 2,2-bis-(p-tolyl)propane is a source material for 2,2-bis-(p-carboxylphenyl)propane, which is a polyamide and polyester intermediate.

The methods which have been used in the past for the manufacture of homologs of 2,2-bis-(p-tolyl)propane are generally not applicable in the manufacture of 2,2-ditolylpropane. For example, 2,2-diphenylpropane has been prepared heretofore by reaction between dimethylphenyl carbinol and benzene in the presence of aluminum chloride (J. A. C. S. 73, 4768, (1951)). This process gave mediocre yields (28% of theoretical) when used for synthesis of 2,2-diphenylpropane, and the formation of the latter product was accompanied by the formation of larger quantities of product which was tentatively identified as 1,1,3-trimethyl-3-phenyl hydrindene but which possibly had the structure of a substituted dihydroanthracene. The same product was also obtained (J. A. C. S. 52, 4021, (1930)) by reaction between 2-chloro-2-phenylpropane and benzene in the presence of stannic chloride. Attempts to carry out similar reactions leading to the synthesis of 2,2-bis-(p-tolyl)propane have given mixtures of products and even poorer yields than were obtained in the case of the synthesis of 2,2-diphenylpropane. Efforts have been made in the past to synthesize 2,2-diarylpropanes by condensation of 2-aryl-1-propanes with aromatic hydrocarbons but these attempts have been unsuccessful, a resinous product being obtained in each case (cf. J. A. C. S. 73, 4769, (1951)).

An object of this invention is to prepare a 2,2-ditolylpropane and particularly 2,2-bis(p-tolyl)propane from readily available starting materials in improved yield. Other objects of the invention will appear hereinafter.

It has been discovered in accordance with this invention that the reaction product obtained by addition of hydrogen chloride to alpha-methyl-p-methyl styrene, upon reaction with toluene under conditions hereinafter disclosed, gives improved yields of 2,2-bis-(p-tolyl)propane.

The product obtained by addition of hydrogen chloride to alpha-methyl-p-methyl styrene contains a chlorine atom attached to tertiary carbon (i. e. the product is 2-(p-tolyl)-2-chloropropane). However, in the presence of anhydrous aluminum chloride, even at temperatures as low as 0° C. this organic halide tends to give up a mol of hydrogen chloride, to form the starting material, namely alpha-methyl-p-methyl styrene. The reaction involved evidently precedes to an equilibrium and the reverse reaction takes place in the presence of an increased concentration or pressure of hydrogen chloride. Under conditions such that the formation of alpha-methyl-p-methyl styrene from the halide is not suppressed by an excess of hydrogen chloride, attempts to use the halide in a Friedel-Crafts reaction result in dimerization of the alpha-methyl-p-methyl styrene to form 1,3,3,6-tetramethyl-1-(p-tolyl)indane. Accordingly, in the condensation of the halide with toluene the reaction conditions, especially the presence of free hydrogen chloride during all stages of the reaction, determines the ratio of 2,2-bis-(p - tolyl)propane/1,3,3,6 - tetramethyl - 1 - (p-tolyl)-indane in the reaction product.

Generally speaking, optimum results are obtained when the quantity of hydrogen chloride initially present is not less than about one mol per mol of AlCl$_3$. However, even a smaller quantity of hydrogen chloride suffices to suppress the dehydrohalogenation of the 2-(p-tolyl)-2-chloropropane, although not preventing it completely. The quantity of HCl present initially is generally at least one mol per 100 mols of 2-(p-tolyl)-2-chloropropane.

It is essential that the alpha-methyl-p-methyl styrene be hydrochlorinated prior to carrying out the Friedel-Crafts condensation, for if the alpha-methyl-p-methyl styrene and HCl are used in place of the halide, the hydrochlorination reaction does not proceed sufficiently rapidly to permit the condensation of the halide with toluene, and instead the reaction proceeds along a different course. This occurs even when the partial pressure of hydrogen chloride is as high as 480 atmospheres at ordinary temperatures. On the other hand, if the hydrochlorination reaction is first permitted to proceed substantially to completion or if the pure halide is employed in the presence of free hydrogen chloride, the Friedel-Crafts condensation of the halide with toluene proceeds satisfactorily, even when elevated temperatures are used.

The chief ditolylpropane isomer obtained in the said Friedel-Crafts condensation is 2,2-bis-(p-tolyl)propane, although very minor quantities of 2,2-(p-tolyl)(m-tolyl)-propane are sometimes simultaneously formed. A series of said condensations was made at temperatures ranging from —70° C. to 54° C. without appreciably altering the ratio of meta isomer present as impurity in the product. The quantity of m-tolyl isomer produced was generally not in excess of about 50% based on the total quantity of ditolylpropane formed.

The Friedel-Crafts condensation of the halide with toluene in the presence of aluminum chloride takes place at any temperature within the range of —70° to about +80° C. It is generally desirable to keep the temperature relatively low (i. e. below about 10° C.) at least during the initial stages of the reaction. The temperature may be raised during the course of reaction if desired.

The invention is illustrated further by means of the following example:

*Example.*—Into a reaction flask equipped with a stirring device, an inlet means, an outlet means, and a thermometer, was placed 162.7 grams of toluene. The flask was cooled in an ice bath and hydrogen chloride gas was bubbled into the mixture with stirring for 15 minutes. During this period of time the increase in the weight of the flask showed that 3.7 grams of hydrogen chloride had been dissolved. To this solution of hydrogen chloride in toluene was added 56.7 grams alpha-methyl-p-methyl styrene and 12.2 grams toluene. The introduction of hydrogen chloride was continued for 75 minutes keeping the temperature below 5° C. The quantity of hydrogen chloride taken into the mixture amounted to 16.2 grams; the theoretical increase in weight for 100% hydrochlorination amounted to 15.4 grams. The solution of halide thus obtained was stored at "Dry Ice" temperature until the time it was used in the Friedel-Crafts reaction.

The catalyst employed in the Friedel-Crafts condensation of the halide with toluene was made in a separate vessel by bubbling hydrogen chloride with stirring into a mixture of anhydrous aluminum chloride and toluene (3.3 grams $AlCl_3$ and 200 ml. of toluene). The introduction of hydrogen chloride was continued with stirring until the aluminum chloride had been completely transformed into a dark oily layer in the reaction mixture. This dark oily layer had the composition of $$AlCl_3 \cdot HCl \cdot 3C_7H_8$$

The flask containing the toluene, and catalyst layer, was placed in an ice bath. When the temperature reached 2.5° C., addition of the hydrochlorinated alpha-methyl-p-methyl styrene solution hereinabove just described was started. This was accompanied by vigorous stirring. The addition of the halide took about 5 minutes with the temperature remaining between 3 and 4° C. Stirring was continued for 20 minutes whereupon the toluene layer was permitted to separate from the catalyst layer. The toluene layer was washed twice with dilute aqueous sodium hydroxide and thereafter washed twice with water. The resulting solution was dried by means of anhydrous sodium sulfate and was distilled through a spinning band column. The distillation gave 38 grams of 2,2-bis-(p-tolyl)propane, having a boiling point of 105 to 114° C. at a pressure of 0.5 mm., and also 26.3 grams of 1,3,3,6-tetramethyl-1-(p-tolyl)indane, having a boiling range of 114° to 130° C. at .5 mm. Infrared analysis of all fractions of the distillate showed no trace of meta substitution, the only apparent products isolated being alpha-methyl-p-methyl styrene dimer and 2,2-bis-(p-tolyl)propane.

It is to be understood that the foregoing example is illustrative only and that numerous methods for practicing the invention will occur to those who are skilled in the art. For example, the condensation reaction can be made to occur without the use of the specific $$AlCl_3 \cdot HCl \cdot 3C_7H_8$$

catalyst which is illustrated in the foregoing example. In fact, a comparable experiment was made in which anhydrous aluminum chloride was employed without first being complexed with either halide or toluene. The yield of product thus obtained was somewhat less than 40% of the yield obtained when the complexed catalyst was employed.

As hereinabove indicated, the 2,2-bis-(p-tolyl)propane which is obtained in the practice of this invention is highly useful as an intermediate for the synthesis of the corresponding dicarboxylic acid, and derivatives thereof, which are components of polyamide and polyester resin compositions. The 2,2-bis(p-tolyl)propane can be purified, if desired, by any convenient method such as by recrystallization of ethanol. The purified product was obtained in the form of white shiny plates which melted sharply at 78 to 79° C.

I claim:

1. A process for preparing 2,2-bis-(p-tolyl)propane which comprises reacting 2-(p-tolyl)-2-chloropropane with toluene in the presence of anhydrous aluminum chloride catalyst and a sufficient quantity of added hydrogen chloride to suppress the dehydrohalogenation of the 2-(p-tolyl)-2-chloropropane.

2. Process of claim 1 wherein the reaction temperature is within the range of −70° C. to +80° C.

3. Process of claim 1 wherein the catalyst, prior to use, is in the form of a complex of the formula $$AlCl_3 \cdot HCl \cdot 3C_7H_8$$

OTHER REFERENCES

Sabatier et al., Comptes Rendus, vol. 155(1912), pages 387–388.